United States Patent
Ranganathan

(10) Patent No.: US 10,259,082 B2
(45) Date of Patent: Apr. 16, 2019

(54) SELF BRAZING MATERIAL AND A METHOD OF MAKING THE MATERIAL

(71) Applicant: ENGINEERED MATERIALS SOLUTIONS, LLC, Attleboro, MA (US)

(72) Inventor: Rajesh Ranganathan, Attleboro, MA (US)

(73) Assignee: EMS Engineered Materials Solution, LLC, Attleboro, MA (US)

( * ) Notice: Subject to any disclaimer, the term of this patent is extended or adjusted under 35 U.S.C. 154(b) by 26 days.

(21) Appl. No.: 15/137,361

(22) Filed: Apr. 25, 2016

(65) Prior Publication Data

US 2016/0311064 A1    Oct. 27, 2016

Related U.S. Application Data

(60) Provisional application No. 62/152,636, filed on Apr. 24, 2015.

(51) Int. Cl.
*B23K 31/02* (2006.01)
*B23K 20/00* (2006.01)
(Continued)

(52) U.S. Cl.
CPC ............ *B23K 35/0238* (2013.01); *B21B 1/22* (2013.01); *B23K 1/00* (2013.01); *B23K 1/008* (2013.01); *B23K 20/02* (2013.01); *B23K 20/04* (2013.01); *B23K 20/16* (2013.01); *B23K 20/233* (2013.01); *B23K 26/0006* (2013.01); *B23K 26/34* (2013.01); *B32B 15/01* (2013.01); *C22C 14/00* (2013.01); *C22F 1/04* (2013.01); *C22F 1/08* (2013.01); *C22F 1/10* (2013.01);
(Continued)

(58) Field of Classification Search
CPC .. C22C 14/00; C22F 1/183; C22F 1/08; C22F 1/04; C22F 1/10; C22F 2001/221; B23K 35/0238; B23K 35/0244; B23K 20/02–20/04; B21B 1/22; B32B 15/01
USPC .......... 228/115–117, 235.2–235.3, 3.1, 56.3, 228/233.2, 262.6, 262.61, 262.71, 262.72
See application file for complete search history.

(56) References Cited

U.S. PATENT DOCUMENTS 3,652,237 A    3/1972  Mizuhara
4,684,052 A *  8/1987  McDonald .......... B23K 35/302
                                                         228/122.1
(Continued)

FOREIGN PATENT DOCUMENTS

EP    0671240       9/1995
EP    2803480       11/2014
JP    63243253 A  * 10/1988

OTHER PUBLICATIONS

Extended European Search Report issued by the European Patent Office dated Sep. 7, 2018 for corresponding European Application No. 16 784 065.1; 12 pages.

*Primary Examiner* — Kiley S Stoner
(74) *Attorney, Agent, or Firm* — Smith, Gambrell & Russell, LLP

(57) ABSTRACT

A method for producing an alloy self-brazing strip. In an aspect, a process is used to generate a multi-layer alloy strip made up of at least one base layer of with a least another layer of material, that when both the material and base layer are brazed, form an alloy. In an aspect, the other layer of material can include a metal. The base layer can include titanium or a titanium alloy.

14 Claims, 3 Drawing Sheets

(51) Int. Cl.

| | | |
|---|---|---|
| *B23K 35/02* | (2006.01) | |
| *C22F 1/04* | (2006.01) | |
| *C22F 1/08* | (2006.01) | |
| *C22F 1/18* | (2006.01) | |
| *C22F 1/10* | (2006.01) | |
| *B32B 15/01* | (2006.01) | |
| *B21B 1/22* | (2006.01) | |
| *C22C 14/00* | (2006.01) | |
| *B23K 20/02* | (2006.01) | |
| *B23K 20/04* | (2006.01) | |
| *B23K 20/16* | (2006.01) | |
| *B23K 20/233* | (2006.01) | |
| *B23K 1/00* | (2006.01) | |
| *B23K 1/008* | (2006.01) | |
| *B23K 26/00* | (2014.01) | |
| *B23K 26/34* | (2014.01) | |
| *B23K 103/10* | (2006.01) | |
| *B23K 103/12* | (2006.01) | |
| *B23K 103/16* | (2006.01) | |

(52) U.S. Cl.
CPC ........ *C22F 1/183* (2013.01); *B21B 2001/221* (2013.01); *B23K 2103/10* (2018.08); *B23K 2103/12* (2018.08); *B23K 2103/166* (2018.08)

(56) References Cited

U.S. PATENT DOCUMENTS

| | | | | |
|---|---|---|---|---|
| 4,826,736 A | * | 5/1989 | Nakamura | B23K 20/04 148/525 |
| 4,923,100 A | * | 5/1990 | Nakamura | B23K 20/04 228/116 |
| 5,028,495 A | * | 7/1991 | Hirano | B23K 35/0238 228/262.72 |
| 5,553,770 A | | 9/1996 | Jha et al. | |
| 5,837,388 A | * | 11/1998 | Doko | B23K 35/286 428/654 |
| 6,475,637 B1 | * | 11/2002 | Strutt | B23K 1/012 228/181 |
| 6,722,002 B1 | * | 4/2004 | Chang | B21B 1/38 148/421 |
| 6,722,022 B2 | | 4/2004 | Chang et al. | |
| 2002/0066769 A1 | | 6/2002 | Haynes et al. | |
| 2004/0134966 A1 | * | 7/2004 | Chang | B21B 1/38 228/56.3 |
| 2004/0231156 A1 | | 11/2004 | Sibum | |
| 2006/0131359 A1 | * | 6/2006 | Pohlman | B23K 1/19 228/56.3 |
| 2009/0020276 A1 | * | 1/2009 | Ueda | B23K 35/0233 165/177 |
| 2013/0299963 A1 | * | 11/2013 | Otaki | H01L 23/36 257/712 |
| 2014/0339288 A1 | * | 11/2014 | Otaki | B23K 20/04 228/117 |
| 2015/0190985 A1 | * | 7/2015 | Oda | H01L 23/3735 312/236 |
| 2015/0354023 A1 | * | 12/2015 | Ranganathan | C21D 8/0436 148/532 |
| 2017/0198991 A1 | * | 7/2017 | Oki | F28F 21/085 |
| 2017/0285295 A1 | * | 10/2017 | Tsujie | G02B 7/026 |

* cited by examiner

SELF BRAZING MATERIAL AND A METHOD OF MAKING THE MATERIAL

CLAIM OF PRIORITY

The present application claims priority from Provisional Patent Application No. 62/152,636, filed on Apr. 24, 2015, the disclosure of which is relied upon and incorporated herein by reference.

FIELD OF THE INVENTION

The present invention generally relates to processes of forming self-brazing materials. Specifically, the present invention relates to self-brazing materials where different metals, such as titanium, are used as a base material in the constituent composition (e.g. Ti-Based material).

BACKGROUND OF THE INVENTION

Generally, brazing (including titanium brazing) involves expensive braze components where the cost is driven by the type of metal used, part complexity and end use requirements.

Traditionally titanium has been brazed either with clad TiCuNi foils or TiCuNi in the powder form. Both processes involve stacking layers of titanium (base metal) with intermittent braze foil/powder and brazing in a highly controlled atmosphere. Such processes have a complicated assembly operation, long assembly time and high yield losses combined with use of expensive vacuum furnaces. The additional actions required in individual stacking the base material and filler metal renders the overall brazing process difficult to automate. Further, individually stacking the base material and filler metal is significantly time consuming and often results in a poor intimate contact between the base metal and the filler material, producing poor braze quality and failed parts. Poor contact between a braze filler and base material can also cause oxidation of surface material which degrades the overall braze quality. Such issues often cause a significant loss in the overall yield of the brazed material. Therefore, there is a need to address the described challenges.

SUMMARY OF THE INVENTION

The present invention is directed at a method for producing a titanium alloy self-brazing strip or other applications that contain filler metal-base metal combinations which allow extracting desired braze constituent elements from the base metal to perform an in-situ braze alloy during brazing. In an aspect, other braze filler metal combinations can be used.

These and other aspects of the invention can be realized from reading and understanding of the detailed description and drawings.

DETAILED DESCRIPTION OF THE INVENTION

Figure 1:
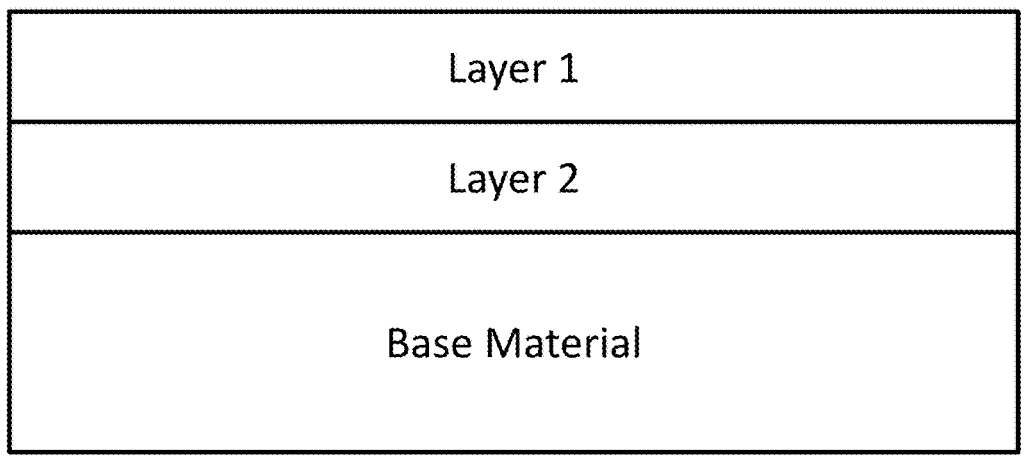
FIG. 1 illustrates a schematic representation of a cross-sectional view of a cladded product according to an aspect of the current invention.
Figure 2:
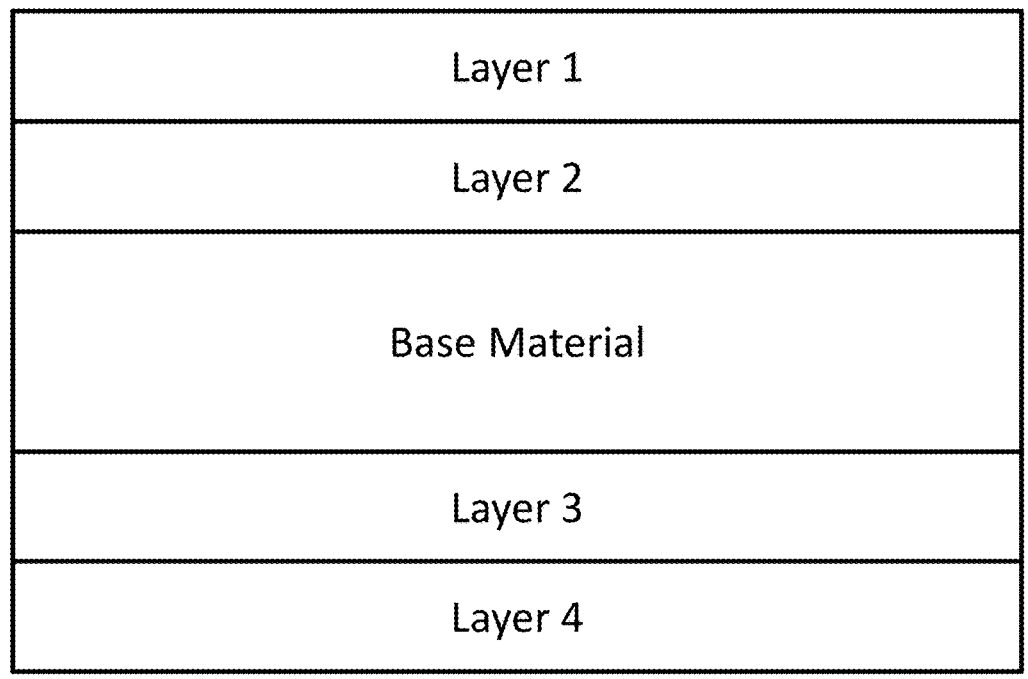
FIG. 2 illustrates a schematic representation of a cross-sectional view of a cladded product according to another aspect of the current invention.

The new process for creating a self-brazing product is described herein. More specifically, a self-brazing alloy strip is created from the process. In effect, a base is joined with another or multiple layer(s) of different materials that can be later brazed, as shown in FIGS. 1-2. Each strip/foil of the self-brazing product includes discrete layers. When the self-brazing product is brazed, then the alloy is formed.

In an aspect, the multi-layer product comprises at least one metal base layer that is joined with at least another layer of metal. In an exemplary aspect, the multi-layer product comprises at least one base layer of titanium (Ti) or titanium alloy that is joined with at least another layer of metal that, when both layers (i.e., the base and other layer) are brazed, form a titanium alloy. In reference to the Ti base layer product, each strip/foil of the self-brazing product comprises discrete layers. In an exemplary aspect, the other metal can include copper (Cu), nickel (Ni) or Zirconium (Zr). The layers are selected according, but not limited, to: (a) brazing temperature (e.g. Zr can be added as an extra layer as melting point depressant)—for lower preferred brazing temperature; and (b) ease of bonding—just one layer can be used to braze. In an aspect, the multi-layer titanium alloy strip can include at least one base layer of titanium (or titanium alloy) along with multiple layers of other metals. The combination of the base layer of titanium and at least one other layer of metal creates a multi-layer titanium alloy self-brazing strip, as shown in FIGS. 1-2.

While the exemplary aspect above focuses on a self-brazing product that has a base material of titanium/titanium alloy to form a titanium alloy when brazed, other base materials, as well as other materials in the other layers, can be used. However, it should be noted that the plurality of layers and base material can include any desired metal or metal alloy sufficient for achieving end product goals. Table 1 details some ideal braze filler metals according to possible base material (e.g. metal) combinations.

TABLE 1

| Braze filler metal by base metal combination | | |
|---|---|---|
| Braze Filler Metal | Chemical Composition | Base Material |
| BAlSi | Silicon (6 to 13%) remainder Aluminum | Aluminum and aluminum alloys |
| BCu | Phosphorus, Silver and remainder Copper | Copper and copper alloys |
| BTi | See above | Titanium Base alloys |

The additional layers are bonded to the base layer through various means, as discussed below. In an aspect, the other materials can be found on either one side (see FIG. 1) or both sides (see FIG. 2) of the base layer. In an aspect, a decision to include a metal on either side of the base layer of the product is based on the end use of the product. In the case of layers on only one side, care needs to be taken to avoid oxidation of the exposed base metal, which can be accomplished by good control of the atmosphere in the brazing furnace.

FIGS. 1-2 provide example of the resulting strip/foil according to aspects of the present invention. As shown in FIG. 1, the base layer can have another at least one other layer (layer 1 and 2) joined to one side. As shown in FIG. 2, the base layer can have at least one other layer (layer 1, 2, 3, and 4) joined to either of its sides. Specifically, the other layers (layers 1,2, 3, and 4) can sandwich/surround the base layer, with layers 1 and 2 being oriented on the upper surface of the base layer and layers 3 and 4 being oriented on the lower surface of the base layer. While FIGS. 1-2 show only combinations of two layers being added to a respective side, other various combination of number of other layers can added to the base layer.

In an aspect, when the self-brazing product is configured to produce a titanium alloy, the strip/foil can include, but are not limited to, the following combination of materials in layered order: Cu/Ti/Cu, Ni/Ti/Ni, Ni/Ti/Cu, Cu/Ti/Ni, Cu/Ni/Ti/Ni/Cu, Ni/Cu/Ti/Cu/Ni, Ni/Cu/Ti/Cu/Ni, Cu/Ni/Ti/Cu/Ni, Zr/Cu/Ti/Cu/Zr, Zr/Ni/Ti/Ni/Zr, Zr/Ni/Ti/Cu/Zr, Zr/Cu/Ti/Ni/Zr, Zr/Ni/Ti/Ni/Cu, Zr/Cu/Ti/Cu/Ni, Ni/Cu/Ti/Cu/Zr, and Cu/Ni/Ti/Cu/Zr among other combinations.

Figure 3:
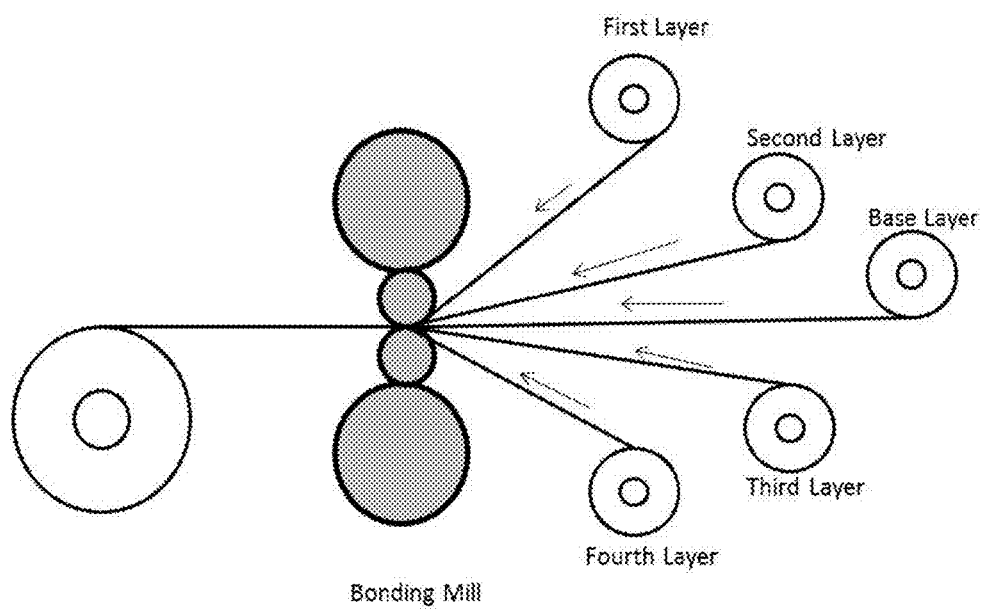
FIG. 3 illustrates a cladding process according to an aspect of the current invention.

The bonding of the material can be done through a clad approach, such as a roll bonding application, as shown in FIG. 3. In an aspect, other bonding/cladding techniques may be used to produce a clad/bond of different metals, such as, but not limited to, hot roll bonding, cold roll bonding, explosion bonding, vacuum bonding, and laser cladding. Although various techniques of cladding can be used to produce the multilayer self-brazing product, a cold roll bonding is the preferred method for metals (e.g., titanium, aluminum, etc.) that oxidize quickly at high temperatures and form stable oxides that are detrimental to achieving a good bond between the layers. A good bond is desired because a weak bond will result in a weak braze. By cladding the multiple layers together, the addition of the layers or powders need not be done as a separate step in the manufacturing process.

FIG. 3 illustrates a roll bonding operation to form the self-brazing alloy product. In an aspect, the roll bonding operation joins a base layer with a plurality of other layers of material. In an aspect, the plurality of other layers can comprise just one additional layer. In other aspects, the plurality of other layers can comprise two layers, one layer to be joined to each side of the base layer. In an exemplary aspect, as shown in FIG. 3, the process can include a base layer and four other layers (first layer, second layer, third layer, and fourth layer) that surround the base layer. However, as discussed above, various numbers of layers can be used. The layers are selected according, but not limited to: (a) brazing temperature (e.g. Zr can be added as an extra layer as melting point depressant)—for lower preferred brazing temperature; and (b) ease of bonding—just one layer can be used to braze.

Figure 4:
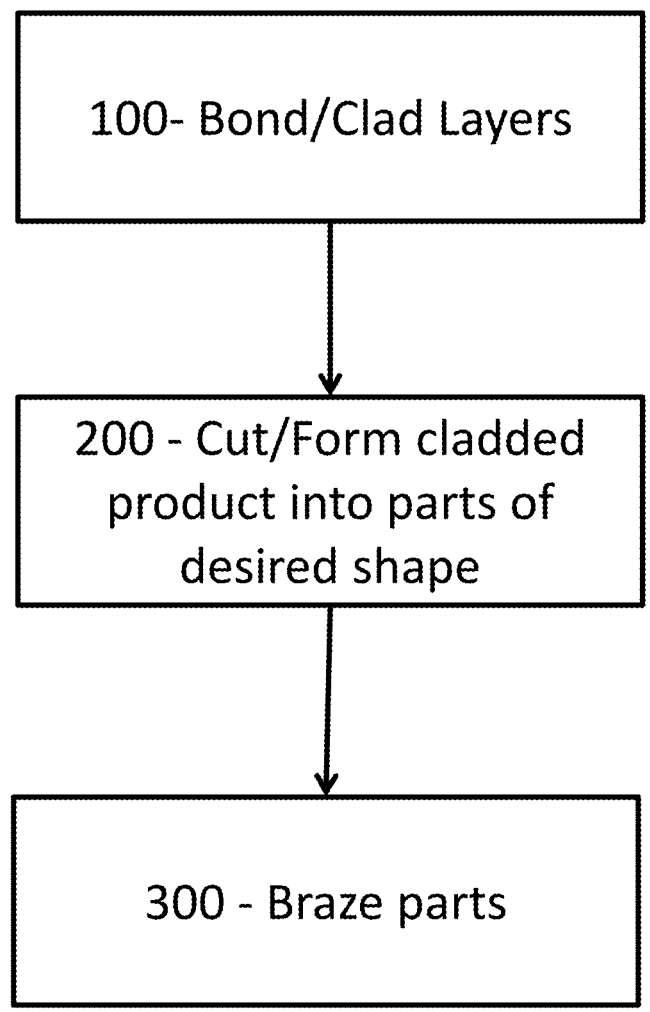
FIG. 4 illustrates a flow diagram of a process according to an aspect of the current invention.

FIG. 4 illustrates the process of producing the self-brazing material for manufacturing purposes. First, the multiple layer self-brazing product is formed by bonding/cladding the layers (step 100). Next, the cladded multi-layer product can be cut or formed into the parts needed for the ultimate manufactured purpose (step 200). Lastly, the parts are then brazed with one another (step 300).

FIG. 3 illustrates a manner in which step 100 (bonding/cladding the layers via cold rolling) is carried out. However, as discussed above, various other bonding/cladding methods can be employed. In an aspect, the self-brazing multi-layered product can be formed into strips or foils, depending on the end application. In an exemplary aspect for creating a self-brazing titanium alloy product containing copper and/or nickel, the multi-layer product is readily rollable to foil gauges (0.002 inches) with no intermediate heat treating or annealing. In an aspect, if an intermediate anneal is desired/necessary before forming the parts that need to be brazed, the process needs to be carefully controlled to avoid the formation of Kirkendall (i.e. because copper and nickel mix readily to form Kirkendall voids). Kirkendall voids can prove detrimental to subsequent forming operations.

Kirkendall voids form at temperatures above 1200 F. (650 C.) for the Copper-Nickel binary phase system. As such, the post heat treatment should ideally be set at 1200 F. or lower. In an aspect, although the titanium will not be completely annealed at temperatures of 1200 F. or lower, it should be sufficiently stress relived to enable further forming operations. It should be noted that, during heat treatment (i.e., the treatment of the multi-layer product before brazing), copper and nickel will mix and alter the chemistry of the product during brazing.

Once the multi-layer product is formed (See FIGS. 1-2 for example), the multi-layer alloy strip can then be cut and/or formed into the various pieces needed for manufacturing purposes (step 200). Various methods of cutting and forming can be used for the desired pieces to be formed with the limitations mentioned above for the operating temperature.

After the needed pieces/components/parts have been made from the self-brazing alloy strip, the components can then be placed together in the desired orientation and brazed to join the components together (step 300). When the brazing occurs, a small amount of the base material can be drawn into the other layers of materials, producing an in-situ braze. Such a process of drawing the base material into a braze joint avoids stacking layers of brazing fillers which contains the base material necessary for brazing, thus producing a more intimate contact and better braze quality. For example, when the base includes titanium and the other layers include nickel or copper alloys, a small amount of the titanium from the base can be drawn into and mixed with the copper and nickel layers.

After carefully selecting the composition and brazing temperature, a braze joint can be achieved, drawing a small amount of titanium from the base metal, by mixing the base metal with the filler metals such as Ni and Cu. The result is an in-situ braze product. For example, to produce a brazed 0.050 inch titanium product with a ratio 15 wt % Cu, 15 wt % Ni and 70 wt % Ti (which is a commercially available braze composition) available at the interface, the bonded layers will have thickness measurements of 0.00075 inches Ni and 0.00075 inches Cu on both sides of a 0.057 inch layer of titanium. During the brazing process, 0.007" inches of titanium will go into the brazing, resulting in a 0.050 inch layer of titanium. The brazing temperature is between 1785 F. (975 C.)-1922 F. (1050 C.). As previously mentioned, the brazing temperature must be carefully controlled because a change in brazing temperature can result in a change in the in-situ braze alloy which can in turn change the amount of titanium extracted from the base metal.

While U.S. Pat. No. 7,527,187 discloses a brazing of a foil to the base material (Ti), the process described above utilizes the base material (e.g., Ti) in the brazing process. In other words, instead of adding a brazing alloy to the base material, the base material is used to form the brazing alloy.

Metals like titanium are reactive and combine with oxygen, carbon, hydrogen and nitrogen readily. As such, it is imperative that highly controlled vacuum furnaces are used to braze exposed titanium products. In an aspect, results from the present invention indicate that the carbon in the graphite elements react with the titanium and form barriers for an ideal braze. Cladding multilayers on both sides of the base titanium avoids exposure to atmosphere which in turn enables the use of furnaces that are less expensive and have less controlled atmospheres.

The products made after the brazing can be used in a variety of operations, including, but not limited to, high volume manufacturing operations, such as the production of heat exchangers, brazed bellows and honeycomb structures. By creating the self-brazing alloy product, there is no need for brazing foils, fluxes and powdered products in the joining phase.

Having thus described exemplary embodiments of a method to produce metallic composite material, it should be noted by those skilled in the art that the within disclosures are exemplary only and that various other alternatives, adaptations, and modifications may be made within the scope of this disclosure. Accordingly, the invention is not limited to the specific embodiments as illustrated herein, but is only limited by the following claims.

What is claimed is:

1. A method for creating a self-brazing alloy product, comprising:
    forming a base layer of first material of titanium or titanium alloy;
    forming at least one other layer of second material comprising copper or nickel; and
    bonding the base layer of the first material to the at least one other layer of the second material, wherein, upon brazing, some of the titanium of the base layer is drawn into the at least one other layer to form an in-situ synthesized brazed product wherein the brazing is applied between 1785 Fahrenheit and 1922 Fahrenheit.

2. The method of claim 1, wherein the at least one other layer of the second material is copper or nickel or a copper or a nickel alloy.

3. The method of claim 1, wherein the at least one other layer of the second material comprises a plurality of other layers of material.

4. The method of claim 1, wherein the bonding of the base layer of the first material to at least one other layer of the second material is performed through a cold rolling process.

5. The method of claim 1, further comprising the step of heat treating the self-brazing product after bonding the base layer of the first material and the at least one other layer of the second material.

6. The method of claim 1, wherein one of the at least one other layer of the second material interacts with the first material of the base layer when the layers are heat treated at a temperature of 1200° F. or less.

7. A method for creating a self-brazing alloy product, comprising:
    forming a base layer from titanium;
    forming at least one other layer from copper and/or nickel; and
    bonding the base layer to the at least one other layer, wherein some of the titanium of the base layer of material is extracted and interacts with the at least one other layer of material to form an in-situ synthesized brazed titanium alloy upon brazing wherein the brazing is applied between 1785 Fahrenheit and 1922 Fahrenheit.

8. The method of claim 7, wherein the plurality of other layers sandwich the base layer of material.

9. The method of claim 8, wherein the bonding of the plurality of layers to the base layer consists of only the plurality of layers and the base layer.

10. The method of claim 9, wherein the heat treating does not exceed 1200° F.

11. The method of claim 7, wherein the at least one other layer of material comprises a layer of copper and a layer of nickel.

12. The method of claim 11, wherein, to produce the self-brazing product having a thickness of approximately 0.050 inches after brazing, the bonded plurality of layers has 0.057 inches of the titanium base layer bonded with 0.00075 inches of the copper layer and 0.00075 inches of the nickel layer sandwiching the base layer.

13. The method of claim 12, wherein the self-brazing product is subjected to brazing such that 0.007 inches of the titanium of the base layer is drawn into the nickel layer and the copper layer.

14. A method for creating a self-brazing product comprising the steps of:
    a. providing a material comprising titanium or titanium alloy to form a base layer;
    b. cladding the base layer to another layer comprising copper and/or nickel;
    c. cutting the cladded material into self-brazing parts of a desired shape; and
    d. brazing the self-brazing parts together, wherein the brazing forms a brazing alloy from the base layer without the need for brazing foils, fluxes or powdered products in a jointing phase wherein the brazing is applied between 1785 Fahrenheit and 1922 Fahrenheit.

* * * * *